United States Patent [19]

Fromm

[11] 4,387,785
[45] Jun. 14, 1983

[54] OPTICAL DEVICE FOR MONITORING CRITICAL SPEEDS OF A ROTATING MEMBER

[75] Inventor: Ingrid Fromm, Munich, Fed. Rep. of Germany

[73] Assignee: Siemens Aktiengesellschaft, Berlin & Munich, Fed. Rep. of Germany

[21] Appl. No.: 181,695

[22] Filed: Aug. 27, 1980

[30] Foreign Application Priority Data

Sep. 12, 1979 [DE] Fed. Rep. of Germany ....... 2936893

[51] Int. Cl.³ ........................... G01P 1/08; G01P 3/48
[52] U.S. Cl. ..................................... 181/142; 340/671; 324/175
[58] Field of Search ................ 181/142; 324/166, 175; 340/524, 600, 671; 73/705; 455/606

[56] References Cited

U.S. PATENT DOCUMENTS

| | | | |
|---|---|---|---|
| 1,878,658 | 9/1932 | Aronoff | 324/175 |
| 3,307,164 | 2/1967 | Zimmer | 324/175 |
| 3,312,829 | 4/1967 | Sprengers et al. | 340/671 |
| 3,575,129 | 4/1971 | Sullivan | 324/175 |
| 3,729,047 | 4/1973 | Bohnlein et al. | 324/175 |
| 3,742,486 | 6/1973 | Skidmore | 324/175 |
| 4,031,466 | 6/1977 | Krause et al. | 324/175 |
| 4,037,157 | 7/1977 | Campbell | 356/28 |
| 4,093,853 | 6/1978 | Hunt | 324/175 |
| 4,162,399 | 7/1979 | Hudson | 324/175 |
| 4,183,017 | 1/1980 | Sims | 340/868 |
| 4,195,291 | 3/1980 | Burks | 340/671 |
| 4,204,115 | 5/1980 | Boldridge | 324/175 |
| 4,234,053 | 11/1980 | Erich | 367/41 |
| 4,264,905 | 4/1981 | Shapiro | 324/175 |
| 4,326,298 | 4/1982 | Fromm et al. | 455/606 |

FOREIGN PATENT DOCUMENTS

| | | | |
|---|---|---|---|
| 25567 | 3/1981 | European Pat. Off. | 324/175 |
| 898162 | 7/1949 | Fed. Rep. of Germany | 324/175 |
| 1018660 | 10/1957 | Fed. Rep. of Germany | 324/175 |
| 2639822 | 12/1977 | Fed. Rep. of Germany | . |
| 2730737 | 1/1979 | Fed. Rep. of Germany | 332/7.51 |
| 555573 | 9/1974 | Switzerland | 181/142 |
| 1279804 | 6/1972 | United Kingdom | 340/671 |
| 720406 | 3/1980 | U.S.S.R. | 324/175 |

OTHER PUBLICATIONS

D. A. Kleinman et al., "The Photophone–Physical Design", *J. Acoustical Society of America*, vol. 60, No. 1, Jul., 1976, pp. 240–250.

Nelson et al., "Photophone Performance", 7/76, pp. 254–255, Jour. Acoust. Soc. Am., vol. 60, #1.

Rumar et al., "On RPM and AF Meter", 3/72, pp. 193–194, J. Instr. Eng. (India) Electron. & Telecomm., vol. 52, No. 7.

*Primary Examiner*—Nelson Moskowitz
*Attorney, Agent, or Firm*—Hill, Van Santen, Steadman, Chiara & Simpson

[57] ABSTRACT

An optical device for monitoring the speed of a rotating member characterized by a reflector mounted on a surface of the rotating member adjacent the periphery to travel in a circular path, a light source creating an input beam and either directing it at along a given angle of incidence at a point on the circular path of the reflector or through a waveguide at the point, a second waveguide arranged on the path of light reflected by the reflector and conducting the reflected light to an optoacoustical transducer which converts the reflected light pulses into sound.

12 Claims, 1 Drawing Figure

LIGHT SOURCE

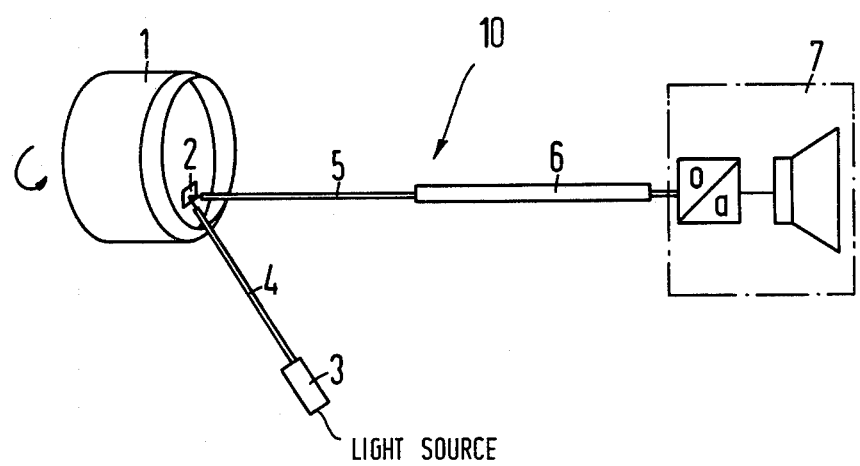

OPTICAL DEVICE FOR MONITORING CRITICAL SPEEDS OF A ROTATING MEMBER

BACKGROUND OF THE INVENTION

The present invention is directed to an optical device for monitoring critical speeds of a rotating member.

With rotating members, such as rotors, which are rotating at high speeds for example in turbines, centrifuges, machine shafts, problems will often occur. These problems are that a specific speed dare not be exceeded or that the appertaining device dare not be operated in a range of a critical speed.

Previously known methods of tachometry or, respectively, speed monitoring either make use of purely mechanical or made use of electromagnetic means. The measuring methods by means of purely mechanical means has many disadvantages such as a relatively high wear and, thus, a short service life. In addition, the mechanical measuring method has the disadvantage, which, due to the necessary mechanical coupling to the rotor to be monitored requires that the tachometer be installed at a location of the device to be monitored. Electromagnetic tachometry methods have the advantage with respect to pure mechanical tachometry methods because electromagnetic methods may have a special arrangement and they need not be bound to the location or site of the machine whose rotating member is being monitored. However, in certain cases, it might be disadvantageous that an electrical connection exist between the device to be monitored and the measuring and/or displaying means.

SUMMARY OF THE INVENTION

The present invention is directed to providing an optical device for monitoring critical speeds of a rotating member which device does not exhibit the above mentioned disadvantages. The optical device of the present invention provides a wear free arrangement which is neither bound to the location or site of the device to be monitored nor requires an electrical connection to the device to be monitored.

The inventive optical arrangement or device for monitoring critical speeds of a rotating member comprises at least one reflector being arranged on a surface of the rotating member near the periphery or in the proximity of the circumference of the member to rotate in a circular path, a light source creating an input beam, means, which are either the light source per se or a light waveguide, for directing the input beam from the light source along a path of a suitable angle of incidence at or toward a point on the circular path of the reflector so that the input beam is reflected as an output beam along a second path, said device including a waveguide arranged on the second path to receive the reflected beams created by the input beams striking the reflector and an opto-acoustical transducer being connected to the light waveguide for converting the light pulses into sound.

The inventive optical device has the advantage that no mechanical moving parts are required. In addition, no electrical connections whatsoever are required between the rotating member of the device to be monitored and the optical device. Finally, the optical device can be positioned at a location such as a control room which is at a distance from the rotor or rotating member.

The light source may be either a coherent light source or an incoherent source and can either emit a steady constant or continuous light or can emit light pulses which are selected to agree with the critical speed and produce the desired frequency for an alarm. The waveguide, which receives the reflected light beam may be a multifiber light waveguide or a single waveguide. The reflector may either be a partially mirroring of a surface of the rotating member, a glass prism or a mirror which has been mounted on the surface of the moving member.

The opto-acoustical transducer may be provided with a resonator, which exhibits a natural resonance which is matched to the pulse frequency of the output beam or the reflected beam which is produced at a critical speed.

BRIEF DESCRIPTION OF THE DRAWING

The FIGURE schematically illustrates the optical device of the present invention.

DESCRIPTION OF THE PREFERRED EMBODIMENTS

The principles of the present invention are particularly useful in an optical device or arrangement generally indicated at 10 in the FIGURE. The device 10 includes a reflector 2, which is arranged on a surface of the rotating member or rotor 1 which is to be monitored. As illustrated, the rotor 1 rotates as indicated by an arrow so that the reflector 2 which is adjacent a peripheral edge of the rotor 1 will move in a circular path.

The device 10 includes a light source 3, which creates an input beam 4 that is directed at the circular path of the reflector 2 along a path of a given angle of incidence so that when the input beam 4 strikes the reflector 2 and output beam 5 will be reflected along a second given path to be received by a light waveguide 6. As mentioned, the reflector 2 can be realized either as a mirror or a glass prism. The input beam 4, will be reflected by the reflector 2 when the member 1 is in a particular rotational position, and thus the reflected beam 5 will be composed of light pulses with each pulse signifying that the member was at the given position. The speed of the rotor 1 will determine the number of pulses per unit of time. This beam of pulses, which is received by the light waveguide 6, is conveyed or transmitted to an opto-acoustical transducer 7. The opto-acoustical transducer 7 is a known device and examples are disclosed in German A.S. No. 2,639,822. See: article "The photophone-physical design" J. Acoust. Soc. Am., Vol. 60, No. 1, July 1976.

In the sample embodiment illustrated, the light source 3 is preferably a coherent light source, namely, a laser diode. However, the invention can also utilize a light source 3 which is realized as an incoherent light source for example from a light emitting diode or LED.

The light source according to the invention can either emit a continuous light or can emit pulses of light of a frequency which is selected in accordance with the critical speed of the device to be monitored and the desired frequency of the alarm to be emitted by an opto-acoustical transducer. Thus the frequency of light pulses of the source 3 and the critical speed of rotation will produce a pulse frequency in the reflected or output beam 5 which is of the desired frequency for an alarm. According to a further development of the invention, the opto-acoustical transducer can be provided with a resonator. This resonator exhibits a natural resonance which is matched to the pulse frequency of the output beam 5 which frequency is produced by the critical speed. To that end, a gas chamber volume of the opto-acoustical transducer, which is known per se, is expediently selected in such a manner that its natural resonance coincides with the critical frequency. In accordance with this invention, a Helmholtz resonator can also be provided whose natural frequency coincides with the critical frequency. The resonator matched to this critical frequency serves for the acoustical amplification of the alarm which is to be emitted.

The light waveguide 6 can consist of a single fiber or a multifiber bundle can form the light waveguide 6.

The present invention is distinguished by its particular simplicity and its resistance to wear. It is also distinguished by the fact that no kind of electrical connection need exist between the appertaining machine space and the control room in which the alarm may be present.

It is also possible in another embodiment of the invention to utilize a plurality of reflectors which are attached to the rotor. These reflectors are uniformly distributed so that the favorable matching between the appertaining critical speed and the resonance behavior of the opto-acoustical transducer and/or the resonator is rendered possible.

Although various minor modifications may be suggested by those versed in the art, it should be understood that I wish to embody within the scope of the patent granted hereon, all such modifications as reasonably and properly come within the scope of my contribution to the art.

I claim:

1. An optical device for monitoring critical speeds of a rotating member having a periphery, said device including at least one reflector being arranged on a surface of the rotating member near the periphery of the member to rotate in a circular path, a light source producing an input beam, means for directing the input beam toward a point of the circular path of the reflector at a given angle of incidence, a light waveguide being arranged at a suitable interval from the circular path and at a suitable angle to receive a reflected beam from said reflector which occurs when the input beam is reflected by said reflector, and an opto-acoustical transducer being connected to said light waveguide to receive the reflected beam and convert light pulses into sound, said opto-acoustical transducer being provided with a resonator, which exhibits a natural resonance which is matched to a pulse frequency of the reflected beam produced by the reflector when the rotating member is at a critical speed so that when the rotating member reaches the critical speed, the transducer with the resonator emits an acoustical alarm.

2. An optical device according to claim 1, wherein the means for directing comprises the light source directing the beam along the input path at said point.

3. An optical device according to claim 1, wherein the means for directing comprises a waveguide receiving an input beam from the light source and directing it in the desired path at said point.

4. An optical device according to claim 1, wherein the light source is a coherent light source.

5. An optical arrangement according to claim 1, wherein the light source is an incoherent light source.

6. An optical device according to claim 1, wherein the reflector is a mirror secured on said rotating member.

7. An optical device according to claim 1, wherein the reflector is a glass prism secured on the rotating member.

8. An optical device according to claim 1, wherein the reflector is realized by partially mirroring a portion of the surface of the rotating member.

9. An optical device according to claim 1, wherein the waveguide consists of a multifiber light waveguide.

10. An optical device according to claim 1, wherein the light source emits in a continuous input light beam.

11. An optical device according to claim 1, wherein the light source emits light pulses, said light pulses having a frequency selected in accordance with the critical speed for the rotating member and in accordance with the desired frequency of an acoustical alarm associated with the device.

12. An optical device according to claim 1, wherein the opto-acoustical transducer is located at a distance from the rotating member preferably in a control room.

* * * * *